US005620555A

United States Patent [19]
Choudhury

[11] Patent Number: 5,620,555
[45] Date of Patent: Apr. 15, 1997

[54] ULTRASONICALLY WELDED PLASTIC RIBBON AND APPARATUS AND PROCESS FOR FORMING SAME

[75] Inventor: Hrishikesh Choudhury, Gurnee, Ill.

[73] Assignee: Abbott Laboratories, Abbott Park, Ill.

[21] Appl. No.: 438,579

[22] Filed: May 10, 1995

Related U.S. Application Data

[62] Division of Ser. No. 156,530, Nov. 19, 1993, Pat. No. 5,439,720, which is a continuation of Ser. No. 783,307, Oct. 28, 1991, abandoned.

[51] Int. Cl.⁶ .................................................. B32B 31/00
[52] U.S. Cl. .......................................... 156/580.2; 428/167
[58] Field of Search .................... 428/99, 167; 156/580.2

[56] References Cited

U.S. PATENT DOCUMENTS

| 3,756,900 | 9/1973 | Michel | 156/580.2 |
| 4,740,256 | 4/1988 | Vosberg | 156/580.2 |

*Primary Examiner*—Alexander Thomas
*Attorney, Agent, or Firm*—A. Nicholas Trausch; David C. Hannum

[57] ABSTRACT

A multi-tubing ribbon wherein the side-by-side lengths of plastic tubing are ultrasonically welded together at spaced intervals along the length of the ribbon whereby to provide a multi-tubing ribbon having non-welded sections spaced along its length which renders it very adaptable for use in a variety of situations and a process and apparatus for fabricating same.

6 Claims, 2 Drawing Sheets

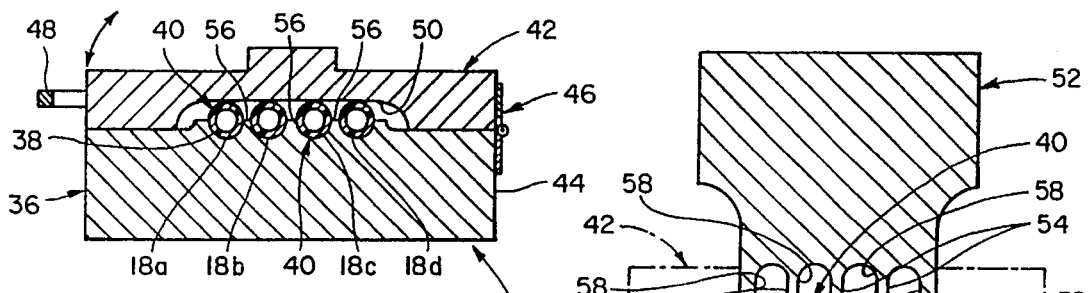
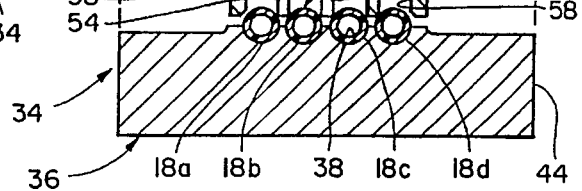
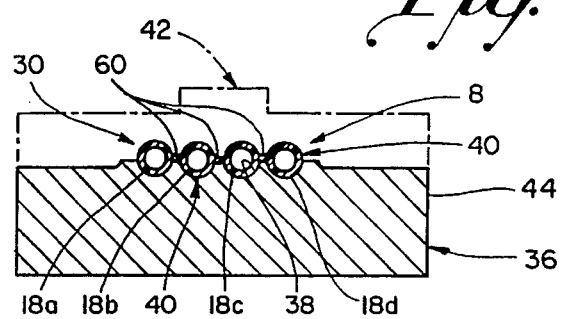
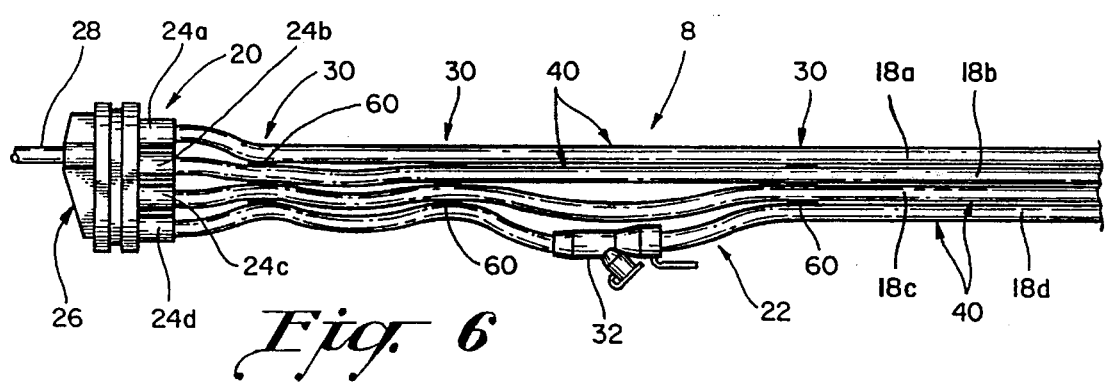

ULTRASONICALLY WELDED PLASTIC RIBBON AND APPARATUS AND PROCESS FOR FORMING SAME

This is a division of U.S. patent application Ser. No. 08/156,530, filed Nov. 19, 1993, now U.S. Pat. No. 5,439,720, which is a continuation of U.S. patent applicaiton Ser. No. 07/783,307, filed Oct. 28, 1991, now abandoned.

BACKGROUND OF THE INVENTION

In the field of medicament administration, the development of multi-flow infusion pumps has improved the simultaneous delivery and administration of more than one medicament. To prevent the tangle of individual plastic medical tubes that would normally result from such multi-drug/ solution delivery set-ups and the problems that could result therefrom, unitary ribbons comprising two or more lengths of plastic tubing disposed side-by-side were developed for the delivery of multiple drugs and solutions simultaneously without mixing them together until just prior to infusion of same into a patient. Such tubing ribbons have been fabricated by several different methods including the extrusion of multi-tubing ribbon, chemical bonding of individual lengths of tubing to one another, adhesively securing individual lengths of tubing together, and the use of external hot air to bond side-by-side lengths of tubing to one another. The ribbon extrusion method is very costly, due to custom-designed molds and fixtures, as is the chemical-bonding and adhesive processes which are also relatively messy and require "clean-up" procedures. Bonding by means of the application of external heat is a lengthy procedure and one which can result in heat distortion of the lengths of plastic tubing.

It is understood that with all of the processes described herein, the lengths of tubing are secured together throughout the entire length of the unitary multi-tubing ribbon which results in a major problem when the ends of the individual tubing lengths comprising the ribbon must be separated from one another, as for example, for connection to more widely-spaced-apart inlet ports of a manifold connector to which the tubing ribbon is to be connected. In separating the bonded tubing ends, the wall portions of the ends are often damaged so that the connection thereof to such manifold inlet ports results in leaks rather than properly sealed connections. Further, it would be difficult, if not virtually impossible, to connect a connector or adapter, such as a Y-connector, into just one of the individual tubing lengths of the multi-tubing bonded ribbon.

SUMMARY OF THE INVENTION

The present invention is directed to a new and novel unitary ribbon formed of two or more lengths of plastic medical tubing secured together in side-by-side relationship and to an apparatus and process for fabricating same.

This new and novel unitary ribbon is unique in that the side-by-side lengths of plastic tubing may be welded or bonded together ultrasonically only at spaced intervals along the length of the ribbon. Thus, when the ribbon is cut through an unwelded section thereof, undamaged tubing ends are available for reliable sealed engagement with, for instance, slightly spaced apart inlet ports of a manifold connector. Further, if it is desired to connect a connector, such as a Y-connector, for introducing a further drug into just one of the tubing lengths of the ultrasonically welded ribbon, a cut may easily be made in that one tubing length at an unwelded section of the ribbon.

This ultrasonic welding process disclosed herein is much faster and cleaner than any of the ribbon-forming processes previously discussed herein and requires the use of no chemicals. The apparatus for ultrasonically forming the novel tubing ribbon of the present invention includes a base member having a plurality of side-by-side grooves formed in its upper surface for receiving lengths of plastic tubing to be welded together, means for clamping the tubing in the grooves at spaced intervals along the length thereof, and a series of sonic horns having welding blades on the underside thereof movable downwardly between the clamping means until each welding blade on each of the sonic horns is in contact engagement with side-by-side lengths of tubing. The sonic horns are actuated at a frequency in the order of 40,000 cycles or vibrations whereby the outer surfaces of the side-by-side tubing lengths are melted with the melted plastic material flowing downwardly between the tubing lengths where it joins together and hardens, thus forming an ultrasonic weld therebetween. The section of the tubing ribbon between the welded portions thereof are not bonded together and can be spread out and cut either individually or all simultaneously for the purposes previously discussed herein. This unique tubing ribbon is very adaptable and overcomes most, if not all, of the previously discussed problems associated with currently available tubing ribbons.

An object of the present invention is to provide a new and novel ultrasonically welded plastic tubing ribbon of side-by-side tubing lengths which is characterized by unwelded sections at spaced intervals along the length thereof which renders the ribbon much more adaptable than currently available tubing ribbons.

Another object of the present invention is to provide a new and novel process for forming such a new and novel tubing ribbon and a new and novel apparatus for carrying out this unique process including a grooved nest-like base member, means for clamping two or more lengths of plastic tubing in the grooves in side-by-side relationship, and sonic horns having sealing blades engageable with adjacent lengths of tubing for ultrasonically welding the lengths of tubing to one another at spaced intervals along the length thereof.

BRIEF DESCRIPTION OF THE DRAWINGS

The features which are believed to characterize this invention are set forth in the appended claims. The invention itself, together with its features, objects, and attendant advantages, will be best understood by reference to the following detailed description of a presently preferred embodiment thereof, taken in conjunction with the accompanying drawings, in which:

FIG. 3 is a vertical sectional view taken generally along the line 3—3 of FIG. 2;

FIG. 4 is a vertical sectional view taken generally along the line 4—4 of FIG. 2;

FIG. 5 is a vertical sectional view similar to FIG. 4 after actuation of the sonic horns and before removal of the ultrasonically welded plastic ribbon from the base member; and FIG. 6 is an enlarged top plan view of an end segment of the plastic tubing ribbon of the present invention showing same connected to a manifold connector and showing a Y-connector connected in an individual tubing thereof.

DESCRIPTION OF THE PREFERRED EMBODIMENT

Figure 1:
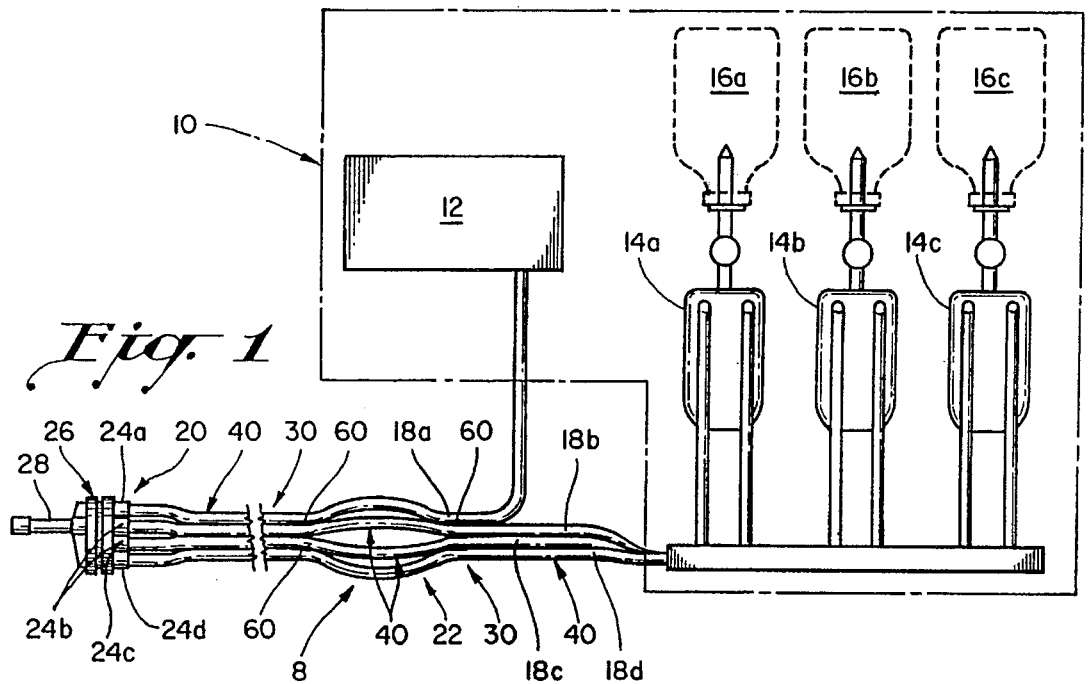
FIG. 1 is a diagrammatic view of a multiple infusion pump set-up for a patient which utilizes a preferred embodiment of the unitary plastic ribbon of the present invention.

Referring now to the drawings, a preferred embodiment of a portion of the claimed invention is illustrated diagrammatically in FIG. 1 where there is shown a unitary ultrasonically welded multiple plastic tubing ribbon 8 which is connected to a multiple infusion pumping unit 10 for a situation in which a patient requires delivery and administration of more than one medicament either simultaneously or in a prescribed sequence. The pumping unit 10 includes a primary pump 12, which could be a peristaltic type pump, for the carrier solution and three cassette programmable type pumps 14a, 14b and 14c which deliver three different drug/solution medicaments from vials 16a, 16b and 16c as prescribed for a particular patient. Each of the pumps 12, 14a, 14b and 14c have their outlets connected to one of the individual tubing lengths 18a, 18b, 18c and 18d of the tubing ribbon 8.

As shown in FIG. 1, the ultrasonically welded tubing ribbon 8 is characterized by at least two unwelded sections 20 and 22 which are disposed at spaced intervals along the length of the ribbon 8. Most, if not all, multiple tubing ribbons known in the art are characterized by side-by-side tubing lengths which are secured together throughout the entire length of the ribbon. The non-welded section 20 facilitates fluid-tight connections of the ends of the four individual tubing lengths 18a, 18b, 18c and 18d to the inlet ports 24a, 24b, 24c and 24d of a manifold-like multiple-ported device 26 having a single outlet connection 28 to a patient. It is noted that the inlet ports 24a, 24b, 24c and 24d are spaced further apart than the four individual tubing lengths 18a, 18b, 18c and 18d in a welded section 30 of the unitary tubing ribbon 8. If this type of connection were required with the fully bonded tubing tapes known in the prior art, separation of the bonded end portions could result in damage to the wall structure thereof, particularly with thinner-walled tubing, and inlet port connections which are not properly sealed. Thus, with the tubing ribbon 8 wherein the side-by-side lengths of tubing 18a, 18b, 18c and 18d are ultrasonically welded together at spaced intervals so as to define non-welded sections, such as 20 and 22, the individual tubing lengths 18a, 18b, 18c and 18d may be cut as a group or individually without damaging the cut end portions thereof to permit the sealed connection of male or female connectors thereto, such as the Y-connector 32 which is shown connected in tubing length 18d in FIG. 6 so that a still further medicament could be administered to the patient through tubing length 18d.

Figure 2:
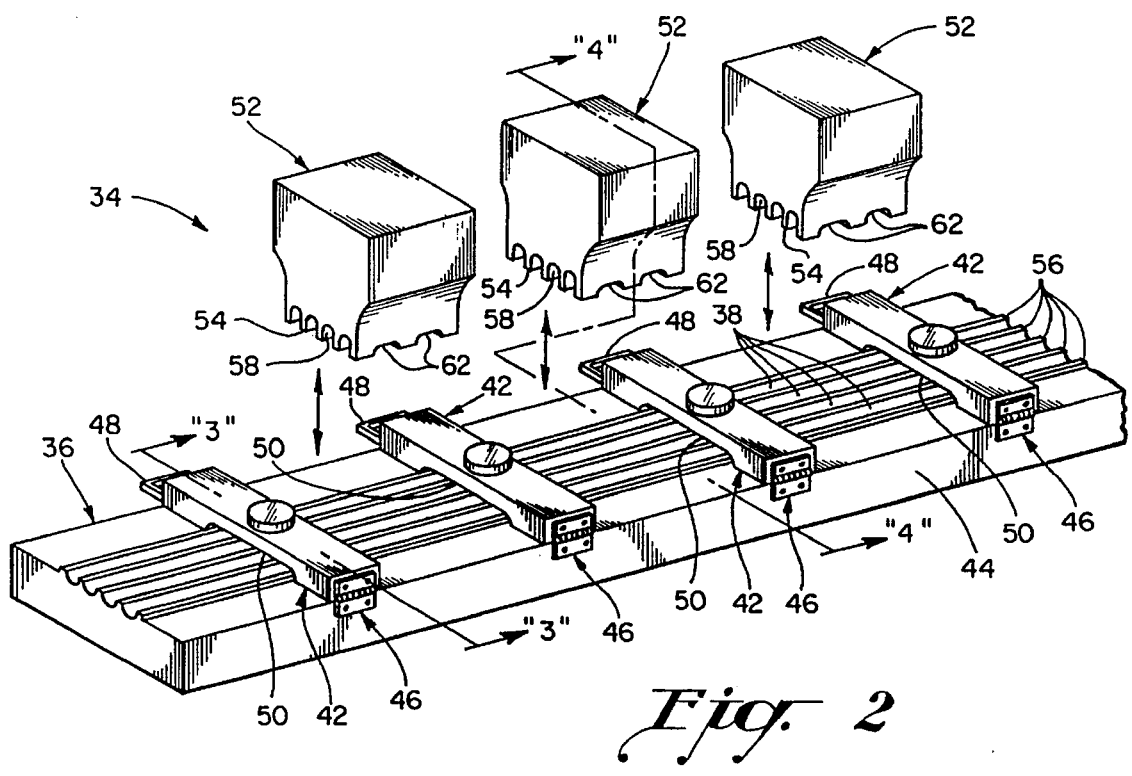
FIG. 2 is a perspective view of a preferred embodiment of the apparatus of the present invention for performing the process of the present invention for fabricating the preferred form of the unitary plastic ribbon shown in FIG. 1.

The process for forming this tubing ribbon 8 and the apparatus 34 for performing the process are believed to be new, novel and unique. As shown in FIGS. 2, 3, 4 and 5, the apparatus 34 is characterized by an elongated base member 36 which has two or more elongated, semi-cylindrical grooves 38 formed in the upper surface thereof in side-by-side closely adjacent relationship. The grooves 38 are adapted to receive therein elongated lengths of plastic medical tubing 40 as shown in FIGS. 3, 4, and 5. Clamping devices 42 are hingedly connected to a side wall 44 of the base member 36 by hinges 46 at longitudinally spaced intervals along the length of the base member 36 for pivoting movement laterally across the grooves 38 so as to retain the tubing lengths 40 in the grooves 38 during the ultrasonic welding portion of the process, as shown in FIG. 3. Handles 48 are provided on the non-hinged ends of the clamping devices 42 for pivoting same. As shown in FIGS. 2 and 3, depressions 50 are provided in the undersides of the clamping devices 42 so that the tubing lengths 40 will not be flattened by the clamping devices 42.

The ultrasonic welding portion of the apparatus 34 is characterized by one or more sonic horns 52, each of which is provided on its underside with one or more series of parallel, side-by-side sealing or welding blades 54. As shown in the embodiment of FIG. 2, a sealing horn 52 is provided for the spaces between each two adjacent clamping devices 42. Obviously, the longitudinal dimension of the sealing horns 52 must be less than the distance between two adjacent clamping devices 42.

Although not shown in the drawings, each horn 52 is provided with a generator-transducer for ultrasonically activating the horn 52 and its welding blades 54 at a frequency in the order of 40 kHz and with means for lowering and raising the horns 52 relative to the base member 36.

As illustrated in FIG. 4, each horn 52 is lowered until each of its inner three welding blades 54 is in contact engagement with the outer surfaces of two adjacent side-by-side plastic tubing lengths 40 and above the anvil surfaces 56 defined between the grooves 38. The width of the three inner welding blades 54, which are defined by grooves 58 formed in the underside of each horn 52, is slightly greater than the closest distance between each pair of adjacent, side-by-side lengths of tubing 40, which later distance is approximately the same as the width of each anvil surface 56.

When each sonic horn 52 is activated, the thermal effect of the ultrasonic vibrations melts the outer surfaces of the two adjacent lengths of plastic tubing 40 in contact with the opposite edges of the welding blades 54 in contact therewith with the melted plastic flowing downwardly onto the anvil surface 56 therebetween where it hardens, after deactivation of the sonic horn 52, and forms a welded bond 60 (FIG. 5) between the two adjacent side-by-side lengths of tubing 40. With this ultrasonic welding taking place simultaneously between each adjacent pair of plastic tubing lengths, the result is the multi-tubing ribbon 8 of any desired length. It is to be understood that although only four tubing lengths 40 are shown in the unitary ribbon 8 illustrated in the drawings, the number of tubing lengths may be less or greater depending on the intended use therefor. The grooved base member and sonic horn would, of course, have to be modified.

As best illustrated in FIG. 2, the welding blades 54 on each sonic horn 52 are longitudinally interrupted by grooves 62 which extend transversely of the longitudinally disposed grooves 58 defining the welding blades 54. With these longitudinal interruptions in the welding blades 54 and the portions of the tubing lengths 40 disposed between each two adjacent sonic horns 52, including the portions disposed under the clamping devices 42, this apparatus 34 provides a tubing ribbon 8 which is characterized by intermittently spaced welded and non-welded sections at any desired spaced intervals which makes the tubing ribbon 8 much more adaptable than those presently known tubing ribbons wherein the side-by-side tubing lengths are bonded to one another along the entire length of the ribbon. Obviously, the apparatus 34 could be modified to provide a tubing ribbon wherein the tubing lengths 40 are ultrasonically welded together for the full length of the ribbon. In this instance, where it might be necessary to separate the tubing ends for connection to a multiple-ported connector, it has been found that with this ultrasonically welded ribbon it is easier to peel the individual lengths of tubing apart than with tubing ribbon formed by other known processes.

The scope of the invention is set forth in the following claims rather than in the foregoing description of preferred forms of the product, apparatus and process and it will be obvious to those skilled in the art that changes and modifications may be made without departing from the invention.

I claim:

1. An apparatus for forming a unitary ribbon of plastic tubing in the form of two or more lengths of tubing disposed in side-by-side relationship, said apparatus comprising, an elongated base member having an upper surface with two or more parallel, generally semi-cylindrical longitudinally extending and closely adjacent grooves formed in the upper surface thereof and defining a nest for two or more lengths of plastic tubing, a series of releasable clamps disposed along the length of said base member in spaced relationship for retaining said lengths of tubing in said grooves, a series of sonic welding horns disposed one between each pair of clamps and having one or more longitudinally disposed welding blades each vertically aligned with the spacing between each two side-by-side lengths of tubing, means for moving said sonic welding horns downwardly into sonic welding engagement with said side-by-side lengths of tubing, and means for activating said sonic welding horns at an ultrasonic frequency for welding said non-contacting side-by-side tubing lengths together at spaced intervals along the length thereof to define a unitary ribbon of plastic tubing.

2. Apparatus as defined in claim 1 wherein four grooves are provided in said elongated base member with four lengths of plastic tubing nested therein, and wherein each sonic horn is provided with three welding blades.

3. Apparatus as defined in claim 1 wherein said clamps are hingedly mounted on said elongated base member.

4. Apparatus as defined in claim 1 wherein the lateral thickness of each sonic welding blade is slightly greater than the closest distance between its side-by-side lengths of tubing.

5. An apparatus for joining two lengths of hollow plastic tube in side-by-side contact comprising:

a base fixture having two grooves separated by a flat surface having a predetermined width so that two hollow tubes are positionable in a closely spaced, non-contact relationship, a sonic horn positionable over said flat surface of said base fixture between said grooves wherein said horn has a width greater than the predetermined width of the flat surface between the two grooves and less than the distance between the inner diameters of the two hollow tubes when positioned in said grooves, and means for moving said sonic horn into contact with the two hollow tubes and activating said sonic horn so as to ultrasonically weld said hollow tubes together without change to the inner diameters of the two tubes.

6. An apparatus for joining a plurality of hollow plastic tubes in side-by-side contact comprising:

a base fixture having a plurality of grooves, each adjacent pair of said grooves separated by a flat surface having a predetermined width, said grooves constructed to receive hollow plastic tubes therein in a closely spaced, non-contact relationship, a sonic horn positionable over at least one of said flat surfaces of said base fixture, said sonic horn having a width greater than the predetermined width of said at least one flat surface and less than the distance between the inner diameters of hollow tubes received in adjacent of said grooves, and means for moving said sonic horn into contact with hollow tubes received in adjacent of said grooves and for activating said sonic horn so as to ultrasonically weld the hollow tubes together without change to the inner diameters of the tubes.

* * * * *

UNITED STATES PATENT AND TRADEMARK OFFICE
CERTIFICATE OF CORRECTION

PATENT NO. : 5,620,555
DATED : April 15, 1997
INVENTOR(S) : Choudhury

It is certified that error appears in the above-indentified patent and that said Letters Patent is hereby corrected as shown below:

Column 5, line 17, change "semi-cylindrical" to --semi-cylindrical,--.

Signed and Sealed this

First Day of July, 1997

Attest:

BRUCE LEHMAN

*Attesting Officer*  *Commissioner of Patents and Trademarks*